May 30, 1933.  D. PHILLIPS  1,912,305
ASTRONOMICAL DEVICE
Filed Sept. 25, 1931  3 Sheets-Sheet 1

WITNESSES

INVENTOR
David Phillips,
BY
ATTORNEY

May 30, 1933.  D. PHILLIPS  1,912,305
ASTRONOMICAL DEVICE
Filed Sept. 25, 1931    3 Sheets-Sheet 2
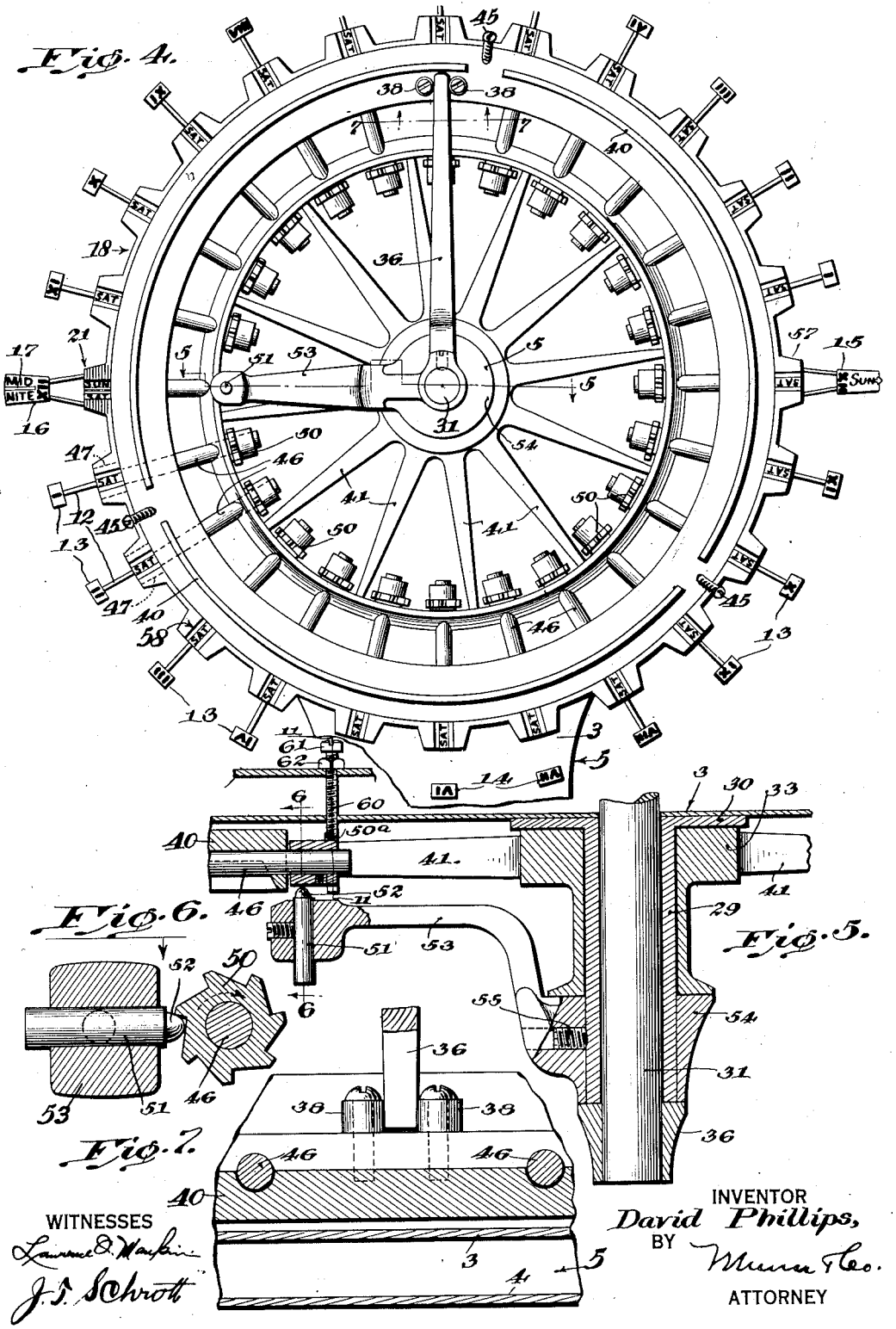
WITNESSES
INVENTOR
David Phillips,
BY
ATTORNEY

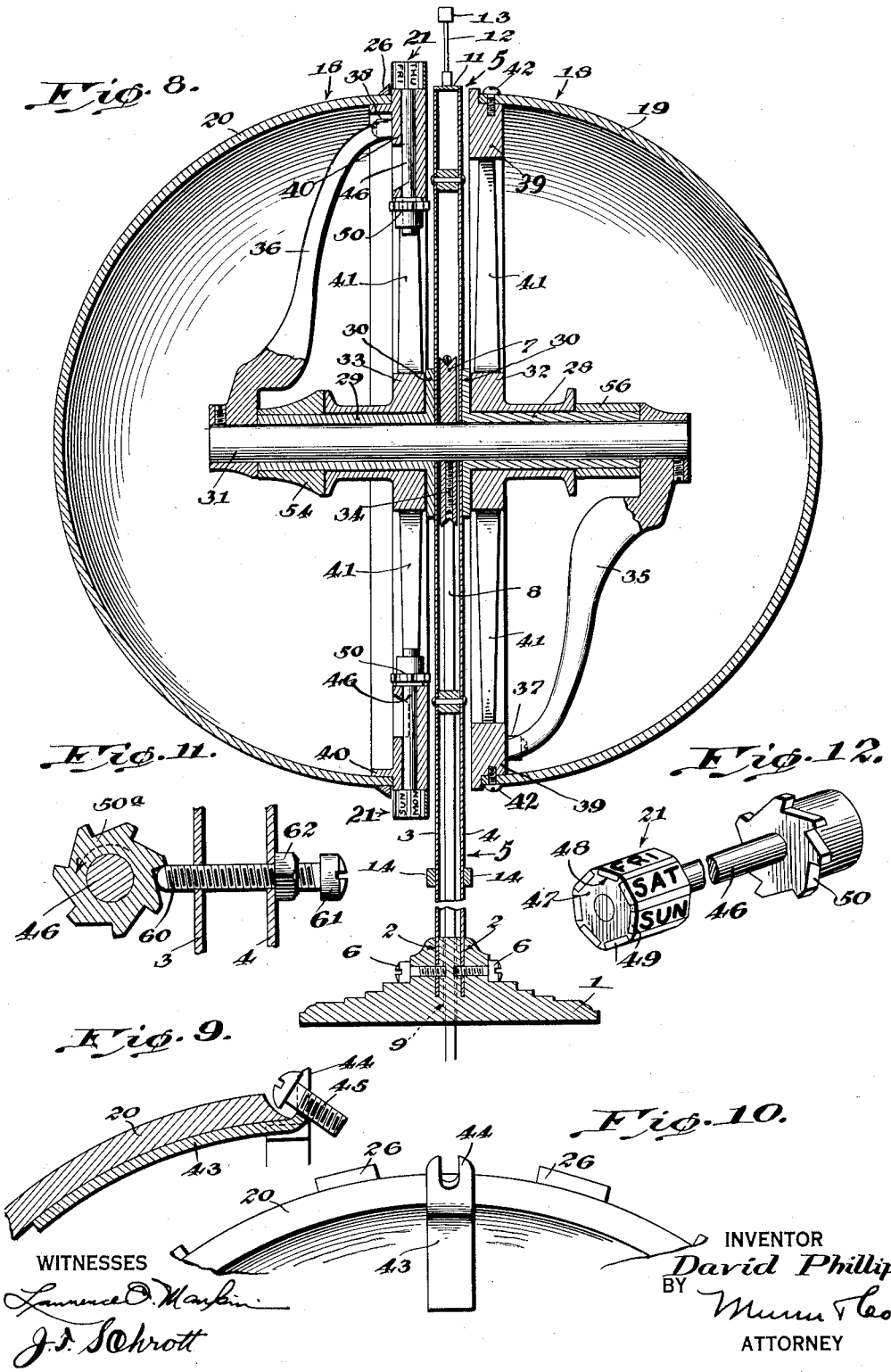

Patented May 30, 1933

1,912,305

UNITED STATES PATENT OFFICE

DAVID PHILLIPS, OF DAYTONA BEACH, FLORIDA

ASTRONOMICAL DEVICE

Application filed September 25, 1931. Serial No. 565,170.

This invention relates to improvements in educational devices, and more particularly to astronomical devices of the type patented by David Phillips June 28, 1927, 1,634,207 and disclosed in a co-pending application of David Phillips filed May 25, 1930, Serial No. 455,737, and it consists of the constructions, combinations and arrangements herein described and claimed.

One of the outstanding objects of the instant invention is to provide means for enabling the convenient and easy visualization of the phenomenon of the change of both days and time in respect to the earthly sphere.

A further object of the invention is to provide a terrestrial globe having mounting means intended to provide a stationary support, the globe being freely revoluble on said mounting means which mounting means not only carries such indicia as hour markers but also has means for causing the manipulation of certain day indicators when the longitudinal hour meridians on which the day indicators are situated reach midnight.

A further object of the invention is to provide an indicating means in combination with a movable terrestrial globe for the purpose of instantly indicating the day and hour at any one point or plurality of points on the entire surface of the earth.

A further object of the invention is to provide an astronomical device for demonstrating to the satisfaction of the student such propositions, ordinarily visualized and understood only with the greatest difficulty from the books, as first that two days are always associated with the international date line and that a crossing of this line will instantly bring the observer from a given day to the succeeding day or vise versa, and second that a day of a given name will be existent somewhere on the earth for forty-eight hours.

Another object of the invention resides in the provision of certain mechanical elements which are a necessary adjunct to the foregoing terrestrial globe in the carrying out of the various purposes briefly stated.

Figure 1:
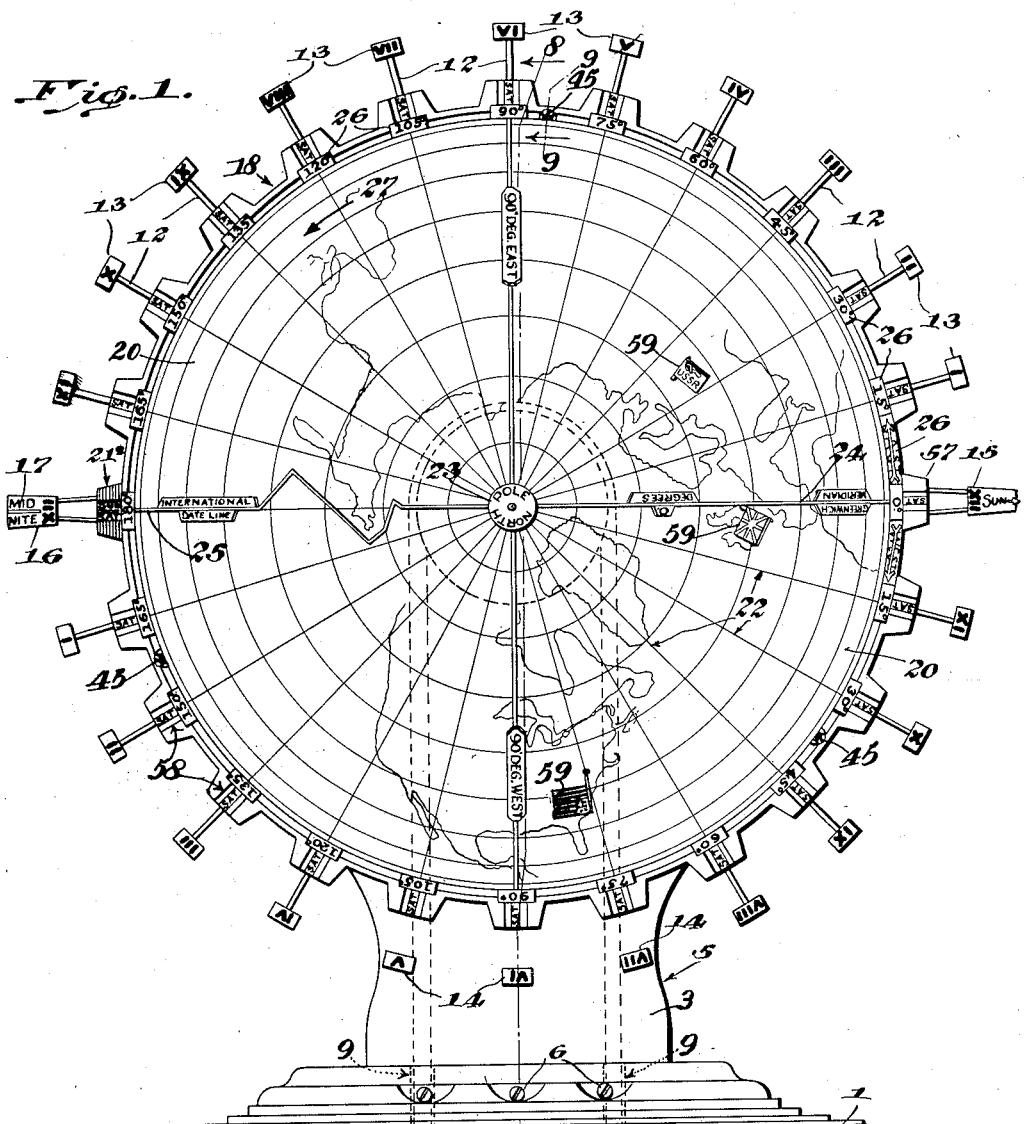
Figures 2, 3:
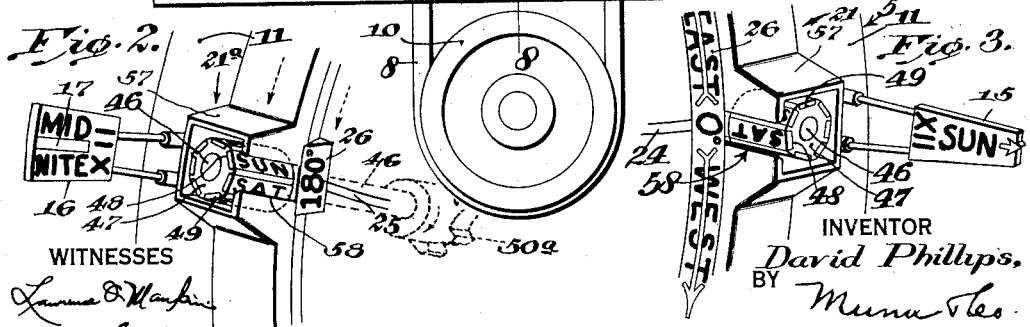

Other objects and advantages will appear in the following specification, reference being had to the accompanying drawings in which:

Figure 1 is a front elevation of the astronomical device, the terrestrial globe being so supported on its mounting means to agree with its position in reference to the sun in celestial space at the time of one of the equinoxes, Figure 2 is a detail perspective view particularly showing the so-called date line indicator or 180° meridian and illustrating the arrival of that indicator at the stationary midnight marker.

Figure 3 is a similar view illustrating the arrival of the day indicator which coincides with the standard or 0° meridian at the point of noon, Figure 4 is an elevation of the device viewed from a position agreeing with that from which Figure 1 was viewed, the Northern Hemisphere being omitted to show the internal workings, Figure 5 is a horizontal section taken substantially on the line 5—5 of Figure 4, illustrating the stationary detents by which the toothed wheels of the ordinary and also the date line indicators are moved a 1/7 step at midnight, Figure 6 is a detail cross section as though taken on the line 6—6 of Figure 5, illustrating the association of the primary stationary detent with one of the toothed wheels of the ordinary day indicators, Figure 7 is a detail section taken on the line 7—7 of Figure 4, particularly showing how one of the drive fingers is connected with its complemental revoluble annulus, Figure 8 is a cross section taken substantially on the line 8—8 of Figure 1, Figure 9 is a detail section taken on the line 9—9 of Figure 1, illustrating the mode of fastening one of the hemispheres to its annulus, Figure 10 is a detail view of a portion of the Northern Hemisphere, particularly illustrating one of the clips which constitutes part of the foregoing fastening, Figure 11 is a detail cross section taken substantially on the line 11—11 of Figure 5, illustrating the association of the other stationary detent with the toothed wheel of the date line indicator, Figure 12 is a detail perspective view of one of the ordinary day indicators.

The instant device is primarily intended as an aid to instructors in astronomy and to students of the subject in the demonstration and understanding of the phenomenon of the change of days and time as this occurs in respect to the terrestrial globe. There are many facts in books on astronomy which are hard to understand, creating the general impression that astronomy is a subject for study by persons of only the utmost astuteness. The instant device is intended to aid in the teaching of certain fundamentals in the study of time, and it is to this subject that the following description is devoted.

A base 1, of any desired type or configuration, provides the means for affixing the device to a support such as, for example, a part of a conveyance which is intended to be moved from place to place for the demonstration of the changes of days and time relatively to the terrestrial globe. This base is slotted at 2 (Fig. 8) to provide places into which the side plates 3, 4 of a stationary standard, generally designated 5, are inserted and permanently secured for instance by means of screws 6.

The slots 2 are spaced sufficiently far from each other to in turn space the plates 3, 4 sufficiently far apart to make room for an internal pulley 7 (Fig. 8) and a belt 8 which applies driving power to the pulley. This belt passes through appropriate openings 9 in the base 1 and is applied to a driver 10 (Fig. 1) which may be operated in any preferred way, for instance by means of a motor. An edge closure 11 (Fig. 8) is applied to the rims of the side plates 3, 4 concealing the internal space and providing a fixed mounting for a plurality of radial stems 12 (Figs. 1 and 4).

All of these radial stems carry stationary indicia herein known as hour markers which in the majority of instances are denoted 13. Several of the hour markers, denoted 14 are applied to the side plates of the stationary standard 5. Others of the hour markers, denoted 15 and 16 are carried by double radial stems which are preferably made double in order to adequately support these markers which are made larger than the rest in order to contain the words "Sun" and "Midnite". The word "Midnite" is divided by a conspicuous colored line 17 (Fig. 1).

The markers 13, 14, 15 and 16 have numerals denoting the hours of a day and night. Beginning with the marker 15, which is preferably made in some semblance of an arrow and is to be regarded as pointing directly to the sun, there is the numeral XII which designates high noon. The numerals on the markers 13, counting in the easterly or counter-clockwise direction read I, II, etc. until they reach XII on the midnight marker 16. Counting from this marker in the same direction the numerals read I, II etc. to the numeral XII already mentioned in connection with the marker 15.

As already stated, the numerals on the various markers denote the hours of a day and night. Those markers appearing at the right of a vertical line drawn through the axis of the device (for example the section line 8—8 of Fig. 1) designate the day hours, while the markers at the left of the line designate the night hours. To facilitate the visualization of the distinction between day and night these sets of markers will be composed of material of contrasting colors, the markers at the right of the vertical line, in practice, being white and those at the left of the line being dark.

A representation of the terrestrial globe is revolubly mounted on the stationary standard 5. The so-called globe 18 (Fig. 8) is made in hollow halves 19, 20. Looking at the device in Figure 1 one sees what is herein chosen as the Northern Hemisphere which comprises the globe half 20.

The Northern Hemisphere is chosen for combination with twenty-four day indicators, twenty-three of which are designated 21 and are known as ordinary day indicators, the twenty-fourth being designated 21ª (Fig. 2) and known as the date indicator inasmuch as it is associated with the 180° meridian or international date line. The Northern Hemisphere is further chosen for demonstration in connection with the annular series of hour markers 13 to 16, but it is to be understood that the description might well be reversed to be read in connection with the Southern Hemisphere 19. This reversal might prove preferable when the device is demonstrated to persons living in the Southern Hemisphere.

Consider first the outer aspect of the Northern Hemisphere 20. Looking at this in Figure 1 one sees the twenty-four hour meridians 22 radiating from the North Pole 23. These are the meridians of longitude and they are 15° apart, dividing the equatorial circumference of the globe into twenty-four equal parts. Certain ones of these meridians are distinguished by heavy colored lines, the 0°, or first or standard meridian as it is sometimes called, being blue for instance, and denoted 24, while the international date line, denoted 25, which falls on the 180° meridian is colored red. The housing of the date indicator which heads the international date line is similarly colored red or may be faced with a red material so that it can be distinguished from the remaining day indicator housings as being one where a change from one day indication to the next first occurs.

Each of the meridians ends at its approximately equatorial terminus in a marker 26 (Figs. 1 and 2) which has a numerical designation or designations imprinted thereon identifying the particular meridian. For instance, the standard meridian 24 terminates at the designation 0°; the second meridian in east longitude ends at the designation 15°; the third meridian in east longitude ends at the designation 30° and so on throughout one-half the circumference of the globe until the 180° meridian, coinciding with the international date line 25 is reached. On a principle identical with the foregoing, the meridians in west longitude are similarly designated until the 180° meridian is again reached.

In order to further enlighten the student, the marker 26 heading the 0° meridian 24 is made sufficiently over-size to contain the words "East" and "West" (Fig. 3) together with arrows which correspondingly indicate the directions. Since the earth revolves toward the east it follows that the globe 18 will be revolved in the counterclockwise direction (arrow 27, Fig. 1) when demonstrating the changes of days and time.

At the head of each meridian, that is to say, in the approximately equatorial region of the hemisphere 20, there is one of the day indicators mentioned before. As each meridian crosses the midnight line 17 (Fig. 1), there will be an instantaneous change in the indicators from one day to the next, with the exception of the so-called date indicator 21ª (Fig. 2) which is so arranged that it will shown adjoining dates on the respective sides of the international date line. This will be more readily understood by the following description of the mounting of the hemisphere 20 as well as of the structure of the indicators themselves and the means by which they are worked.

The stationary standard 5 (Fig. 8) has sleeves 28, 29 permanently fastened to it for example by means of flanges 30 which will be welded or otherwise secured to the side plates 3, 4. These sleeves at once provide a journal for a shaft 31 and bearings for hubs 32, 33 of the hemispheres 19, 20. The previously mentioned internal pulley 7 is permanently secured to the shaft 31 by means of a screw 34 (Fig. 8) or its equivalent, it being clear that when the pulley 7 is driven, the shaft 31 will be driven likewise.

The motion of the shaft 31 must be transmitted to the hemispheres 19, 20 so that these will be driven simultaneously, and since these have no connection with each other by virtue of the interposition of the stationary standard 5 the following means are made use of:—At each end of the shaft 31 there is a fixedly secured drive finger, the two fingers being designated 35, 36. The free ends of these fingers are fitted between abutments 37, 38 (Fig. 7) on the respective ones of a pair of annuli 39, 40. Each set of abutments may merely comprise sleeves slipped on the shanks of screws that are driven into the respective annulus. In assembling the parts the free end of the respective drive finger is slipped between the abutments, but it may be stated that in practice the mode of driving the hemispheres 19, 20 from the shaft 31 may be substituted by means other than shown without affecting the working of the device in the least.

In assembling the drive fingers 35, 36 it is preferable to dispose them on diametrically opposite sides of the shaft 31, (Fig. 8) in order to preserve as nearly balanced an arrangement as possible. One of the drive fingers will be secured to the shaft 31 with its free end between the respective pair of abutments 37 or 38 whereupon the respective hemisphere 19 will be put in place on its annulus. The other drive finger will be positioned in such a way as to assume the foregoing diametrical position and at the same time enable an accurate matching of the hemispheres when the remaining hemisphere is put in place.

Each annulus 39, 40 is connected with the respective hubs 32, 33 by a system of spokes 41 (Fig. 4) or a desired equivalent thereof. The revolution of the shaft 31 inside of the sleeves 28, 29 will cause revolution of the hemispheres 32, 33 on the sleeves by virtue of the driving finger connections with the annuli 39, 40. Since the hemispheres 19, 20 are carried by the annuli it follows that the globe 18 will revolve as a whole when driving power is applied to the pulley 7.

At this point it may be mentioned that the pulley 7 is not necessarily depended upon for the revolution of the globe 18. The device may be stood on a table independently of any source of driving power other than the hand of the instructor which may be applied to any part of the hemisphere facing him for the purpose of turning the globe.

The hemispheres 19, 20 are set in place upon the annuli 39, 40 which are more or less in the nature of circular flanges to provide adequate supports. Any desired mode of fastening may be employed. The hemisphere 19 is more conveniently screwed in place as at 42 (Fig. 8) while in the instance of the hemisphere 20 clips 43 will be used. These clips terminate in forked ends 44 which will be set in place over the shanks of inclined screws 45, and when these are driven home into the annulus 40 by which they are carried, the hemisphere 20 will be firmly held in place. Portions of the annulus 40 are removed adjacent to the screws (Fig. 4) in order to make room for the clips. If desired, the simpler mode of securing the hemisphere 19 may be adopted for the securement of the hemisphere 20.

Now as to the annulus 40 (Fig. 4):— This is made somewhat heavier than the annulus 39 because of its adaptation as a bearing for the plurality of day indicator shafts 46. These shafts are arranged radially (Fig. 4), and there is one shaft for each day indicator 21.

The following description applies to the construction and working of all of the day indicators 21 excepting the so-called date indicator 21ª, the latter being dealt with later. Referring now to one of the day indicators 21, the outer end of the shaft 46 carries a cylinder 47 (Fig. 12) which is appropriately slotted in the longitudinal or axial direction of its outer surface as at 48 to receive seven small plates 49 which have impressed thereon the abbreviated names of the days of the week. For instance, Saturday is abbreviated "Sat." (Figs. 3 and 12). Sunday is abbreviated "Sun.", etc. It would be entirely within the spirit of the invention to make the cylinder 47 a septenary figure on each of the seven faces of which the day abbreviations would be imprinted directly thus avoiding the use of slots and separate name plates, or the cylinder 47 might be a perfectly plain cylinder on the surface of which the abbreviations could be stamped without first making flat places.

As a matter of preference the separate name plates 49 will be used because these can be made in a variety of colors, so that the distinction between days can be more quickly grasped. For instance, when the transition happens to be from Saturday to Sunday at the midnight line 17, the student is more apt to note and grasp the change by seeing the contrasts in colors between the Saturday and Sunday name plates than by reading the abbreviated words.

On the inner end of the shaft 46 (Fig. 4) there is a toothed wheel 50 having seven teeth shaped on the approximate order depicted by Figure 6. The toothed zone of this wheel is in line with a primary stationary detent 51 (Figs. 5 and 6), which has a blunt point 52 intended to be struck by one of the teeth and so become the agency for imparting a one-seventh turn to the shaft 46. It is this one-seventh turn that makes the progressive changes in the day indications of the cylinders 47. For instance if Saturday is indicated prior to reaching the midnight line 17 the then engagement of the wheel 50 with the detent 51 will produce the one-seventh turn so that the designation is changed to Sunday when the midnight line 17 is crossed.

This, in practice, necessitates the positioning of the axis of the detent 51 slightly above the horizontal plane on which the axis of the midnight line 17 falls so that the tooth of the wheel 50 about to be engaged may cause a full one-seventh turn of the shaft 46 by the time the radial center of the respective marker 13 is reached. The pin 51 is carried by a stationary arm 53 (Figs. 4 and 5). This arm is made stationary by virtue of having a hub 54 that is slipped over the end of the sleeve 29 (Fig. 8) and is secured to that sleeve by any appropriate means, for example a set screw 55 (Fig. 5).

The fixed hub 54 serves the additional purpose of holding the revoluble hub 33 (Fig. 8) in its place. In the instance of the revoluble hub 32 (Fig. 8) a simple collar 56 is used because here a duplicate of the stationary arm 53 is unnecessary. The collar 56 will be secured in place on the stationary sleeve 28 similarly to the securement of the hub 54 (Fig. 5) to the sleeve 29.

Each of the indicators, whether of the ordinary day indicators 21 or the date indicator 21ª, constitutes an equatorial projection. Actually the construction comprises a housing 57 (Figs. 2 and 3) projecting radially from the annulus 40 approximately along the equatorial line, and made hollow so as to contain the cylinder or other figure 47. Each housing has a window 58 on the side nearest to the observer, so that only the abbreviations of one day can be seen in the instance of the twenty-three ordinary day indicators, but that in the instance of the date indicator 21ª two abbreviations can be seen at one time.

The last statement will be understood by now considering the date indicator 21ª. This is identified solely with the 180° meridian or international date line 25 (Figs. 1 and 2). It is common knowledge among those skilled in this particular art that the 180° meridian has been generally adopted as the place along which a change from one day to the next in time either twenty-four hours forward or backward may occur when such meridian is crossed regardless of the angular position of the meridian. For example if a ship going west reaches the line of the 180° meridian at 10 o'clock Friday forenoon it becomes 10 o'clock Saturday forenoon the moment the line is crossed. In traveling westward around the earth we lose a day and the chance to get it back is made at the 180° meridian.

This circumstance necessitates an offsetting of the indicator 21ª a 1/14 circumference, so that two adjoining day abbreviations will show at the window 58 of the indicator 21ª (Fig. 2) instead of only one abbreviation as at the remaining day indicators. The abbreviation to eastward (counter-clockwise) will agree with the departing day, while the abbreviation to westward will denote the incoming day which progressively comes into existence as the succeeding meridians pass the midnight line. For example in the drawings, Saturday is the departing day and Sunday the incoming day.

When the 180° meridian coincides with the midnight line 17 the indicator 21ª makes its 1/7 turn so that Sat. agreeing with the departing day, shows below, and Sun. agreeing with the incoming day shows above the international date line. A ship going westward (clockwise) and crossing the 180° meridian will instantly advance its time from Saturday to twenty-four hours later Sunday. The same ship traveling eastward (counter-clockwise) and crossing the 180° meridian would instantly set back its time from Sunday to twenty-four hours later Saturday.

So it is necessary that the indicator 21ª shall indicate adjoining days on the respective sides of the international date line. This is accomplished by simply making a 1/14 difference in the angular setting of the toothed wheel which is denoted 50ª for distinction (Figs. 2 and 11). In other words the teeth of the wheel 50ª will come approximately in the spaces between the teeth of the wheels 50. The direction of the teeth 50ª is reversed from the direction of the teeth 50. Instead of the indicator 21ª turning clockwise, as do the indicators 21 (looking at them in the direction of the section line 6—6 in Fig. 6) they are made to turn counter-clockwise (Fig. 11), looking at them in the plane of the section line 11—11 in Figure 5. The abbreviated designations of the day indicator 21ª also read reversely from those of the day indicators 21.

For the reversal of the date indicator shaft 46 the teeth 50ª are located on the inner ends of the tooth cylinder (Figs. 2 and 5) so as not to be interfered with by the primary detent 51. A secondary detent 60 (Fig. 5) actuates the toothed wheel 50ª only. This may consist of a machine screw, driven the proper distance through the standard 5, the head 61 has a screw driver slot by which adjustments are made, and there is an adjacent jam nut 62 by which the adjustments are locked.

As a matter of convenience the important points on the Northern Hemisphere are designated by flags 59. For instance the United States flag is set at the Capital, Washington. The British flag is set to designate London, England through which the 0° or Greenwich meridian passes, while the Russian flag is set to designate Moscow the Capital of Russia.

The operation is readily understood. Looking at the device in Figure 1 one sees the entire Northern Hemisphere from the North Pole down to the Equator. The sun (not shown) is regarded as being stationed to the right of the device, the marker 15 including an arrow-like configuration pointing to the sun.

It is common knowledge that when the sun is directly over the standard or 0° meridian 24 the time will be 12 o'clock noon anywhere on that meridian. On the next meridian east the time will be 1 o'clock because that meridian has moved 15° or one hour east from noon. On the same principle, on the meridian west of the 0° meridian it will be 11 o'clock because that meridian is 15° or one hour short of the standard meridian.

Assume that the 75° meridian west, which theoretically runs through Washington, D. C. coincides with the radial axis of the marker 15. This will indicate noon in that city. By reading any other point on the Northern Hemisphere (or Southern Hemisphere also) in reference to the hour markers 13, 14 and 16 the observer can instantly ascertain the time at that point. For example, in London, England the time would be 5 o'clock in the afternoon, in Moscow, Russia the time would be approximately 7:30 in the evening, while in San Francisco, California, which is on the 120° meridian west the time would be approximately 9 o'clock in the morning.

So by revolving the globe 18, either by mechanically driven or hand power, it is possible to tell the time whether of day or night at any given point. It is further possible to easily and instantly make comparisons of time between any two points.

It has been brought out before that by generally common agreement each day is regarded as beginning and ending at the 180° meridian when this crosses the midnight line 17. In other words, the 180° meridian is the leader, so to speak, of the new day, and as each of the following meridians cross the midnight line 17 during the eastward rotation of the globe (Fig. 1), the new day will occur at each of such following meridians until the one day is universally present with the exception of the immediate vicinity of the 180° meridian.

As all meridians, excepting the 180° meridian pass the midnight line 17, there is a full and definite change in the respective indicator 21 from one day to the next. As the 180° meridian passes the midnight line there is a similar change in the indicator 21ª, but as previously pointed out this indicator is set to show the designation of adjoining days on opposite sides of the 180° meridian. This will enable the instructor to point out that if it is Saturday (for instance) aboard a ship going west, the moment that ship crosses the 180° meridian the date will instantly be advanced twenty-four hours ahead Sunday.

The statement was made that the day designations of the single indicator 21ª run reversely to the day indications of the remaining day indicators 21, also that the indicator 21 is turned reversely to the remaining indicators. This is necessary in order to make the day couples of the indicator 21 agree with the other indicators east and west after the midnight line is passed. To again use the example in the drawings, the lower indication Sat. of the indicator 21ª must agree with the remaining indications of the departing day, while the abbreviation Sun. must agree with the corresponding abbreviations as they turn up at the midnight line as the globe revolves east.

There is an astronomical proposition that the name of a given day will be existent for forty-eight hours. In other words, at any one meridian a day will be twenty-four hours long, but inasmuch as every meridian must undergo its equatorial progression it requires forty-eight hours for the twenty-four hour day to go around the earth. To demonstrate this fact consider Figure 1. It will be remembered that the change from one day to the next occurs first at the 180° meridian as this meridian passes the midnight line 17. So regarding the change as being from Friday to Saturday, Saturday will occur first on the 180° meridian and last on the 165° meridian west.

Now it is easy to see that when the 180° meridian has reached the midnight line 17, any point on this meridian will have experienced its full period of twenty-four hours and as this meridian passes the midnight line 17 the change will be from Saturday to Sunday. But Saturday at any point along the 165° meridian west will have been only one hour long, and the 165° meridian west must, like the 180° meridian make its full circumferential transit before it too will change from Saturday to Sunday.

This means that the 165° meridian west will still carry the day "Saturday" around until it reaches the crossing point of the midnight line 17 when the change to Sunday will occur. The simplest way of stating the same proposition is to say that Saturday becomes existent on the earth by increasing stages after the date line 25 crosses the midnight line 17 until said date line again reaches the midnight line 17 at which instant it will be Saturday everywhere on earth, but from that instant Saturday remains present by decreasing stages until the 165° meridian west (last to become identified with Saturday) also crosses the midnight line. It is by virtue of these increasing and decreasing stages that the day remains known as Saturday on the earth in general for a period of forty-eight hours.

I claim:—

1. An astronomical device comprising a globe having meridians of longitude inscribed thereon, movable day indicating means coinciding with each meridian, supporting means on which the globe is revolubly mounted, an equatorial series of hour markers with which the meridians and day indicating means are registrable, one of said hour markers constituting a midnight line, and means in the approximate plane of said midnight line for causing a movement of each day indicating means to denote the change from one day to the next as the midnight line is passed by a revolution of the globe.

2. An astronomical device comprising a globe having the meridians of longitude inscribed thereon, day indicators coinciding with the meridians, each indicator comprising a septenary member having its seven faces denoted with the days of the week, and movable means connected with each septenary member capable of a step movement, supporting means on which the globe is revolubly mounted, an equatorial series of hour markers radiating from the supporting means and being traversable by said day indicators, one of said hour markers having a midnight line, and detent means depending on said supporting means for rigid support relatively to the globe, being situated in the approximate plane of the midnight line for successive engagement by said movable means to cause successive turns of the septenary members for changes of indications from one day to the next.

3. An astronomical device comprising a standard, a globe comprising a pair of halves respectively disposed at the sides of the standard thereby locating the standard approximately on the equatorial plane, means by which the halves are coupled together, bearing means carried by the standard on which said means have revoluble support for the revolution of the globe in reference to the standard, a system of stationary indicia carried by the standard, and a system of indicating means carried by the globe adjacent to the standard and being movable past said indicia upon revolution of the globe.

4. An astronomical device comprising a globe consisting of a pair of halves, a standard disposed between the halves, means for coupling the halves to each other through the standard yet enabling revolution of the globe, said means comprising annuli to which the globe halves are affixed, a shaft traversing the standard, means carried by the standard on which the annuli have bearing and in which the shaft is journaled, drive fingers affixed to the ends of the shaft and connected with the respective annuli, a series of indicia circumferentially carried by the standard and being visible in the approximate equatorial plane, and a system of indicating means carried by the globe being movable past said indicia upon revolution of the globe.

5. An astronomical device comprising a globe divided into halves, a pair of annuli to which the halves are affixed, a standard situated between the annuli, means for both coupling the halves together through the standard and providing revoluble support of the globe on the standard, a series of radially disposed shafts having turnable support on one of the annuli and being equi-distantly spaced in the circumferential direction, a multi-faced figure on the outer end of each shaft the faces of each figure having indications in readable positions above the surface of the respective globe half, wheels on the inner ends of the shafts having teeth equal in number to the faces of the figures, stationary means within said respective globe half being engageable by the successive wheels to cause a fractional turn of the respective shafts during revolution of the globe, and indicia stationarily and circumferentially carried by the standard, being equi-distantly spaced and being adapted to be read in reference to said indications.

6. An astronomical device comprising a globe having the meridians of longitude inscribed thereon, an equatorial series of day indicators respectively coinciding with the meridians, each day indicator consisting of a multi-faced figure having the names of the days inscribed thereon, means serving as housings for the figures and comprising outstanding projections, each housing having a window through which an inscription is visible, a standard by which the globe is supported and on which the globe is revoluble by pushing on any one or more of the projecting housings, hour markers carried by the standard being equi-distantly spaced in the circumferential direction to agree with the spacing of the meridians at the equator, and means for successively moving the day indicating figures upon passing a selected hour marker thus to produce a change of indication from one day to the next.

7. An astronomical device comprising a revoluble globe having meridians of longitude inscribed thereon, an indicator coinciding with each meridian, said indicators designating the days of the week, means in fixed position relative to the globe constituting the midnight point, and means for instantaneously changing each of the indicators from one day designation to the next while crossing said midnight point, all of the indicators remaining stationary relative to the globe until said midnight point is reached.

8. An astronomical device comprising a revoluble globe having meridians of longitude inscribed thereon, an indicating device coinciding with each meridian, said indicating devices having the days of the week designated thereon, a shaft for each of the indicating devices, said shafts having bearings on the globe, means stationary relative to the globe constituting the midnight point, and means for imparting an instantaneous part turn to the successive shafts as the indicators of the respective meridians cross said midnight point thereby to change the designation of the respective indicator from one day to the next, said shafts and indicators remaining quiescent during the remaining revolution of the globe.

9. An astronomical device comprising an equatorial standard, circumferentially spaced hour markers including a midnight marker radiating from said standard, a hemisphere having meridians of longitude inscribed thereon including the international date line, means to revolubly support the hemisphere on the standard, an indicator housing coinciding with each meridian including the international date line, each housing having a window, day indicators in the housings, said indicators bearing the names of the week days the single ones of which are readable at the windows with the exception of the window of the date line housing, the indicator in said housing being situated to simultaneously expose the names of adjacent days, and separate means situated coincidently with the midnight marker for successively turning the various day indicators as the midnight line is crossed.

10. In an astronomical device, an equatorial standard, a hemisphere revoluble on the standard, said hemisphere having meridians of longitude inscribed thereon one of said meridians being designated as the international date line, day indicators for all of the meridians excepting the date line, being adapted to have the names of single days exposed to view, a day indicator for the date line being adapted to have the names of adjacent days exposed to view, a plurality of stationary hour markers including a midnight marker, and means in the region of the midnight marker for successively turning the day indicators of the ordinary meridians in one direction and for turning the day indicator of the date line in the opposite direction as the midnight line is passed.

DAVID PHILLIPS.